United States Patent [19]

Elmore et al.

[11] Patent Number: 4,756,797
[45] Date of Patent: Jul. 12, 1988

[54] MULTIPLE EFFECT EVAPORATOR WITH AN EVAPORATIVE CONDENSER AS A LIQUID EVAPORATION EFFECT

[75] Inventors: Carl Elmore; Timothy Carter, both of Glens Falls, N.Y.

[73] Assignee: Kamyr, Inc., Glens Falls, N.Y.

[21] Appl. No.: 920,617

[22] Filed: Oct. 20, 1986

[51] Int. Cl.⁴ .............................................. B01D 1/26
[52] U.S. Cl. ................................. 159/13.1; 159/17.1; 159/49; 159/901; 159/DIG. 8; 202/174; 202/185.3; 202/236; 203/12; 203/27; 203/89; 203/DIG. 8
[58] Field of Search ............... 202/174, 201, 235, 236, 202/185.3; 203/89, DIG. 8, 12, 25, 27; 159/13.1, 901, 49, 17.1, 20.2, DIG. 8, DIG 32

[56] References Cited

U.S. PATENT DOCUMENTS

| | | | |
|---|---|---|---|
| 2,165,044 | 7/1939 | Fox et al. | 202/174 |
| 2,840,154 | 6/1958 | Lankenau | 159/17.1 |
| 3,322,648 | 5/1967 | Kays et al. | 202/174 |
| 3,489,654 | 1/1970 | Geiringer | 202/174 |
| 3,807,479 | 4/1974 | Brannland et al. | 202/174 |
| 3,968,002 | 7/1976 | Standiford | 159/17.1 |
| 4,239,588 | 12/1980 | Englehardt | 202/174 |
| 4,366,027 | 12/1982 | Lauro | 202/174 |

FOREIGN PATENT DOCUMENTS

| | | | |
|---|---|---|---|
| 2747582 | 4/1979 | Fed. Rep. of Germany | 202/174 |
| 0615698 | of 1890 | United Kingdom | 202/174 |

OTHER PUBLICATIONS

"Kamyr" bulletin No. 682, Apr. 1983 Rosenblad Free Flow Evaporators.

Primary Examiner—S. Leon Bashore
Assistant Examiner—V. Manoharan
Attorney, Agent, or Firm—Nixon & Vanderhye

[57] ABSTRACT

A multiple effect evaporator system and a process for concentrating a process liquid wherein evaporated process liquid from one effect serves as heating fluid in an adjacent effect. Low energy heating fluid in vapor form is fed to an evaporative surface condenser where it is condensed and collected as clean and foul condensate. Coolant for the evaporative surface condenser is provided in the form of process liquid from one of the effects. Prior to passage into the evaporative surface condenser, the process liquid is cooled. In the cooling circuit of the evaporative surface condenser, the process liquid absorbs the heat of condensation of the heating fluid and subsequently rejects the heat into a counter flowing air stream. The process liquid is thereafter heated and returned to another of the multiple evaporator effects.

11 Claims, 2 Drawing Sheets

FROM FIG. 1A

MULTIPLE EFFECT EVAPORATOR WITH AN EVAPORATIVE CONDENSER AS A LIQUID EVAPORATION EFFECT

BACKGROUND

Multiple effect evaporators are used in industries where a particular process stream must be concentrated by evaporation to rid the liquid of a substantial amount of its water content to make it more manageable or usable in downstream processes. A typical example is in the practice of conventional continuous chemical pulp production.

Multiple effects, or stages, are now used to minimize the energy input required to evaporate or boil off undesirable water content. The total evaporation achieved in these systems is approximately the number of effects times the energy input to the first effect.

In conventional, multiple effect evaporator systems, a high level (temperature) energy source is input only to the first effect in the series, thereby evaporating water at a lower energy (temperature) level and providing heat for further evaporation in the next effect of the series. This process is repeated until water evaporated in the last of these effects is at its lowest practical energy level. This low level energy in the form of vapor is condensed in a surface condenser using a cooling water source which serves as the ultimate heat sink for the system and maintains the condensing pressure on the evaporator effects preceding it. However, the heat of condensation added to the cooling water takes away its capacity for reuse as a coolant.

Since the cooling water must be provided on a continuous basis, either new cooling water must be provided, while rejecting the heated cooling water or, the heated water can be reused but only after it has gone through a cooling process where the heat absorbed in the surface condenser connected to the multiple effect evaporators is rejected to a cooling air stream.

Previous inventions have sought to simplify the process by utilizing an evaporative cooling surface condenser, whereby the low level energy vapor from the heat evaporator effect is condensed on a heat transfer surface, giving up its heat of condensation to a cooling fluid flowing as a falling film on the outside of the heat transfer surface. At the same time heat is being added to the cooling fluid, the same fluid is being evaporatively cooled by the flow of cooling air around the spaces between the heat transfer surface members. After leaving the heat transfer surface and entering a collection sump underneath, the cooling water is ready for reuse as a coolant while the heat from the last effect of the evaporator has eventually been rejected into a cooling air stream.

SUMMARY OF THE PRESENT INVENTION

The present invention takes the prior art process one step further by using the liquid to be concentrated in the multiple effect evaporator system as the cooling fluid for the evaporative cooling surface condenser.

In this way, the condenser itself becomes an evaporation stage, or effect, serving to further evaporate the liquid to be concentrated, rather than merely a low level energy heat sink for the multiple effect evaporator system. By combining these three separate operations into one piece of equipment, the multiple effect evaporator process is greatly simplified and more energy efficient, while using two less pieces of equipment with attendant cost savings. In its broader aspects, the invention relates to a system which includes:

(a) a plurality of evaporator effects arranged in series, each effect including a process liquid inlet and a process liquid outlet; a heating fluid inlet and heating fluid outlet;

(b) heat exchange means in each effect for passing the process liquid in heat exchange relationship with the heating fluid for evaporating water out of the process liquid; and wherein evaporated water from one effect serves as heating fluid for an adjacent effect; and (c) an evaporative condenser provided with liquid inlet means for receiving process liquid from one of the evaporator effects, and liquid outlet means for transmitting the process liquid to another of the evaporator effects; means for receiving heating fluid in vapor form and for passing the heating fluid vapor in heat exchange relationship with a cooling circuit for condensing the heating fluid vapor, and wherein coolant for the cooling circuit comprises cooled process liquid.

In its more specific aspects, the present invention utilizes as many as five conventional evaporator effects in series, in conjunction with an evaporative surface condenser, which itself becomes an additional evaporator effect.

The weak feed liquid requiring evaporation is introduced equally into the fourth and fifth effects of the series. Liquid in the fifth effect is recirculated over internal heat transfer surfaces where inside vapors from the fourth effect are condensed, giving their heat of condensation to the liquid which evaporates and is concentrated to a still higher solids content.

The concentrated liquid from the fifth effect is then transferred to the fourth effect, joining the remaining portion of feed liquid. This liquid is recirculated over the internal heat transfer surfaces of the fourth effect where inside vapors from the third effect are condensed, giving their heat of condensation to the liquid which, at its boiling point, evaporates and is concentrated to a higher solids content. The concentrated liquid from the fourth effect is transferred to the third effect.

As in the fifth and fourth effects, liquid in the third effect is concentrated to an even higher solids content with the vapors from the second effect supplying the heat.

Up to now, the flow pattern and multiple effect evaporator depicted has been fairly typical of current technology. The point of differentiation of this invention occurs at this point where the liquid from the third effect is cooled as it is flashed to the condensing side of the fifth effect and the evaporative surface condenser effect. The heat energy given up is used as heat input to these effects.

More specifically, the intermediately concentrated liquid from the third effect is introduced into a cooling circuit in the evaporative surface condenser where the liquid flows as a falling film over the internal heat transfer surfaces of the evaporative surface condenser. Vapor from the fifth effect is condensed within the heat transfer surface, giving up its heat of condensation to the above mentioned cooling circuit. Heat added to the cooling circuit is simultaneously released as evaporated water into a counter flowing air stream between individual members of the heat transfer surface.

Evaporation of water from the cooling circuit serves to further concentrate the liquid from the third effect while at the same time cools the cooling circuit, preserving its ability to condense vapors from the fifth effect inside the heat transfer surface of the evaporative surface condenser.

Condenser effect is pumped through three heat exchangers arranged in series, picking up heat from condensing vapors supplied by effects two, three and four, respectively, to the shell sides of the heat exchangers. The liquid, with additional heat picked up in the exchangers, is then transferred to the second effect and recirculated over the internal heat transfer surfaces where inside vapors from the first effect are condensed giving their heat of condensation to the liquid which evaporates and is further concentrated to a an even higher solids content. The concentrated liquid from the second effect is then transferred to the first effect wherein a similar fashion liquid is further evaporated/concentrated with the fresh steam input to the first effect supplying the heat. This is the only external source of heat directly input to the described multiple effect evaporator system.

The liquid is flashed to its final desired product solids content in a flash tank.

A typical system of equivalent steam consumption and evaporation requirements would use six evaporator effects, a surface condenser and an evaporative cooling tower. Using the process technology described above eliminates one evaporator effect and a cooling tower by incorporating their functions as well as the surface condenser's into a single piece of equipment, namely, the evaporative surface condenser effect.

DETAILED DESCRIPTION OF THE DRAWINGS

Figure 1A:
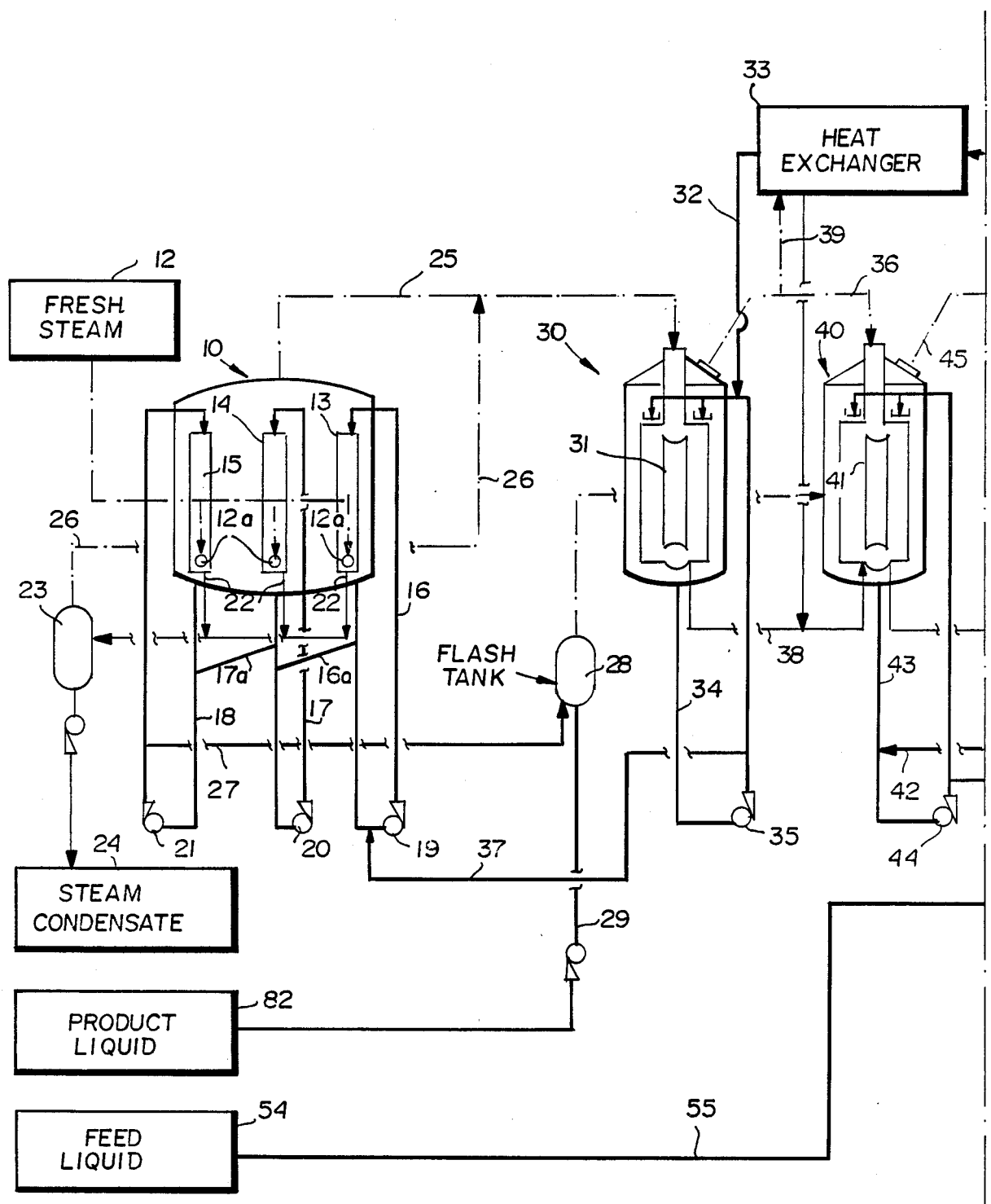
FIG. 1A is a schematic diagram of part of the multiple effect evaporator system in accordance with an exemplary embodiment of the invention.
Figure 1B:
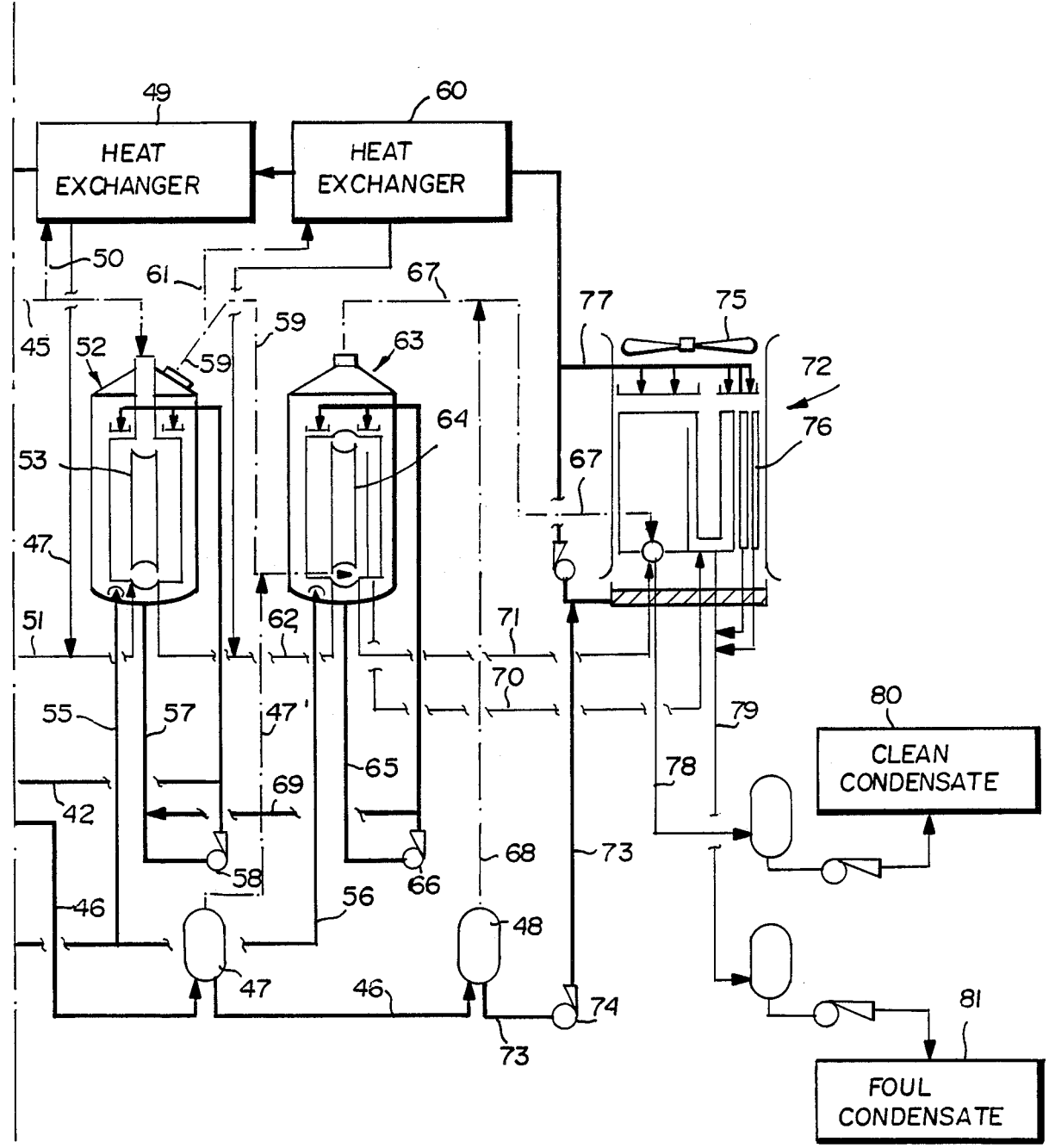
FIG. 1B is a continuation of the schematic diagram illustrated in FIG. 1A.

FIGS. 1a and 1b illustrate a multiple effect evaporator system incorporating an evaporative condenser in accordance with an exemplary embodiment of the invention. It is understood, of course, that while a five effect system is disclosed herein, the invention is equally applicable to systems with differing number of effects, depending on the particular system process.

The multiple effect evaporator system includes a first effect 10 to which fresh steam from a source 12 is added. The evaporator 10 is a conventional type which includes heating element packages 13, 14 and 15 disposed in parallel, vertical alignment within a cylindrical upright vessel. Steam or other heating vapor is introduced into each of the heating element packages through inlets 12A located at the bottom of the respective passages.

Boiling liquid (the liquid to be concentrated) is introduced into effect 10 through lines 16, 16a, 17, 17a and 18, all of which are operatively connected to a main inlet conduit 37. Lines 16, 17 and 18 form parts of three circuits which include pumps 19, 20 and 21, respectively, for the recirculation of boiling liquid through the respective heating element packages in the first effect. In a typical free flow evaporator, such as the Rosenblad falling film type evaporator, the boiling liquid is recirculated from a pool at the bottom of the vessel to the top of the vessel where it is distributed evenly to fall as a thin film over both sides of heat transfer surfaces of each heating element package.

At the same time, steam introduced at inlets 12A proceeds upwardly inside each heating element and condenses, giving off heat to the liquid to be concentrated. The steam condensate flows downward and is removed through lines 22 and flash tank 23 to a steam condensate tank 24.

As the liquid film flows downward on the exterior surfaces of the heating elements, a small portion is boiled off, and the released vapors flow upwardly and are removed from the top of the vessel by an outlet line 25 which feeds the vapors to the second effect 30 as heat for evaporation in the second effect. The vapor in line 25 is supplemented by vapor from flash tank 23, added by way of line 26.

It is understood that the liquid recirculates in the first effect until the desired concentration is achieved. Since first effect 10 in this system is, in fact, the last evaporative stage of the process (as will be explained in detail hereinbelow), the liquid exiting effect 10 through lines 16, 17, 18, all of which are operatively connected to the main outlet line 27 is passed to a flash tank 28 where it is flashed to its desired solids content and subsequently conveyed via line 29 to a liquid product reservoir 82.

The second effect, or stage 30, lies upstream of first effect 10 in terms of the direction of flow of the liquid to be concentrated, but downstream thereof in terms of the direction of flow of the heating fluid. While only one heating element package 31 is shown in the effect 30, two or more may be utilized if so desired. Otherwise, the effect is similar to effect 10 in both structure and operation. Liquid to be boiled is introduced via line 32 from heat exchanger 33 and is recirculated through the effect by way of circuit 34 with the aid of a pump 35. Heat input is received from effect 10 through line 25 in the form of evaporated process liquid, i.e., water vapor. The heat exchange which occurs in the second effect 30 provides water vapor for input as the heating fluid in the third effect 40 via line 36, while the liquid to be concentrated is supplied to the first effect 10 by way of conduit 37. Any heating fluid condensed during the heat exchange is removed from the bottom of effect 30 and is supplied via line 38 to the third effect 40, along with condensate from heat exchanger 33.

As explained further hereinbelow, a portion of the vapors released from the second effect 30 are diverted to a first heat exchanger 33 through line 39.

The third effect 40 includes a heating element package 41 similar to that employed in the second effect 30. Liquid to be boiled is introduced via line 42 and is recirculated through the effect via circuit 43 and with the aid of a pump 44. Heat input, in the form of vapors released from second effect 30, is received via line 36. The heat exchange which occurs in the third effect provides water vapor for input as the heating fluid in the fourth effect via line 45, while the now more concentrated liquid is removed via line 46 and flashed in tanks 47, 48 before being supplied to the evaporative surface condenser effect as hereinafter described.

A portion of the vapors released from the third effect 40 via line 45 are diverted to a second heat exchange 49 via line 50. At the same time, condensed vapors are removed from the bottom of the third effect 40 and are supplied to the fourth effect 52 via line 51, along with condensate from heat exchanger 49.

A fourth effect 52 is provided with a heating element package 53. Liquid to be concentrated is supplied directly from a liquid feed tank 54 through line 55, as well as through a line 69 from the fifth effect 63. The liquid is recirculated through the effect via circuit 57, including a pump 58. Heat exchange occurs as in the previous effects, with heat input supplied from the previous effect 40 through line 45. Vapors released from boiling the liquid in the fourth effect are supplied by line 59 to the fifth effect 63, while the liquid to be concentrated is thereafter supplied to the third effect via line 42. A portion of the released vapors is diverted to a third heat exchanger 60 via line 61, while condensed interior vapors are removed via line 62 and passed to the fifth effect 63, along with condensate from heat exchanger 60.

The fifth effect 63 operates in much the same manner as the previous effects. Heat is supplied from the fourth effect via line 59 supplemented by vapors from flash tank 47, while liquid to be concentrated is supplied directly from feed tank 54 via line 56. The effect 63 includes a heating element package 64 and a recirculation circuit 65 which includes a pump 66. In the heat exchange process, released vapors are carried by line 67 to the evaporative surface condenser effect supplemented by vapor from flash tank 48 in line 68. Liquid to be concentrated is removed via line 69 and supplied to the fourth effect 52. Condensed, interior heating fluids are removed from the effect in lines 70 and 71 and carried to the evaporative surface condenser effect 72.

The evaporative surface condenser effect 72 receives process liquid, cooled as a result of flashing to tanks 47, 48 through line 73 with the aid of pump 74. The process liquid is used as a coolant for the evaporative surface condenser and, in the process, is concentrated to a higher solids content, i.e., the evaporative surface condenser itself becomes an evaporative stage or effect. Low energy vapor is supplied to the evaporative condenser via line 67 from the fifth effect 63 and flash tank 48. The evaporative surface condenser is of the falling film type and includes an air stream generating impeller 75, heat transfer surfaces 76, a liquid outlet line 77 and condensate outlets 78, 79 which are connected to clean and foul tanks 80, 81, respectively. As the coolant liquid flows downwardly over the heat exchange surfaces as a falling film, the low energy heating fluid vapor gives up heat to the coolant liquid and condenses. The heat added to the coolant liquid is simultaneously released as water vapor into a counter flowing air stream generated by fan 75. Thus, the liquid coolant is further concentrated and, at the same time, cooled for further use as the evaporative surface condenser coolant. Liquid coolant (the liquid to be concentrated) is subsequently transported via line 77 to the heat exchanger 60 as explained in more detail hereinbelow.

The manner in which the multiple effect evaporator system is utilized in conjunction with the evaporative surface condenser effect is set forth in greater detail below.

OPERATION

In operation, weak feed liquid requiring concentration through evaporation is supplied from a tank 54 and introduced equally into the fourth and fifth effects 52, 63, respectively, through lines 55, 56. Liquid in the fifth effect 63 is recirculated over the heat transfer surface of the heating element package 64 via circuit 65 as inside vapors from the fourth effect 52 are condensed, giving their heat of condensation to the liquid which, at its boiling point, evaporates and is concentrated to a higher solids content.

The concentrated liquid from the fifth effect 63 is then transferred to the fourth effect 52, by way of line 69, where it joins the remaining portion of the feed liquid from tank 54. The recirculation circuit 57 in the fourth effect circulates the liquid over the heat transfer surfaces of the heating element package 53 where inside vapors from the third effect 40 are condensed, giving their heat of condensation to the liquid which, at its boiling point, evaporates and is concentrated to an even higher solids content. Concentrated liquid from the fourth effect 52 is thereafter transferred to the third effect 40 via line 42.

In a third effect 40, the liquid is further concentrated as it passes across heat exchange surfaces on packages 41 in heat exchange relationship with vapors from the second effect 30.

In accordance with the present invention, concentrated liquid from the third effect is carried by line 46 to flash tanks 47, 48 where it is cooled. Released vapors are carried to the condensing side of the fifth effect 63 in line 58 and to the evaporative surface condenser effect 72 by line 68. The cooled liquid is then introduced into the cooling circulation circuit of the evaporative surface condenser effect 72 in line 73 with the aid of pump 74.

Vapors from the fifth effect 63 and tank 48 are condensed within the heat transfer package 76 giving up heat of condensation to the cooling circuit. This heat is simultaneously released as evaporated water in a counter flowing air stream generated by the fan 75. Such evaporation of water serves to further concentrate the liquid from the third effect 40 while, at the same time, maintaining the cooling circuit liquid at a low enough temperature to preserve its ability to be utilized as a coolant for the evaporative surface condenser.

Concentrated liquid from the evaporative surface condenser effect is thereafter pumped through line 77 to heat exchangers 60, 49 and 33 wherein it absorbs heat supplied by vapors released in second, third and fourth effects 30, 40 and 52, respectively. Condensed heating fluid from the heat exchangers 60, 49 and 33 is returned to lines 38, 51 and 62, respectively, where it joins condensed heating fluids from the second third and fourth effects.

Heating fluid condensate flow out of the evaporative surface condenser effect is segregated so that clean condensate may be collected in tank 80 via line 78, and foul condensate may be collected in tank 81 via line 79.

Meanwhile, the liquid to be concentrated, now heated by way of passage through exchangers 60, 49 and 33, is fed into the second effect 30 via line 32. After further concentration in the second effect, the liquid is fed into the first effect 10 via line 37. As earlier described, the liquid is circulated through heating element packages 13, 14 and 15 via recirculation circuits 16, 17 and 18. The liquid is recirculated in the first effect, in heat exchange relationship with the fresh steam from source 12, until the desired concentration is reached. The liquid is then flashed to its final desired solids content in tank 28 and thereafter transported via line 29 to the liquid product tank 82.

The operation described above may be stated as a process which, broadly stated, includes the following steps:

(a) feeding process liquid from a source to at least one effect of a series of effects in a multiple effect evaporator;

(b) passing the process liquid in counterflow heat exchange relationship with relatively high energy heating fluid causing water to evaporate out of said process liquid;

(c) utilizing water vapor evaporated from the process liquid in said one effect as a heating fluid in at least one adjacent effect;

(d) providing an evaporative surface condenser for condensing low energy heating fluid;

(e) feeding cooled process liquid to the evaporative surface condenser as a coolant and passing the low energy heating fluid in heat exchange relationship with the cooled process liquid and releasing the heat of condensation given up to the process liquid as evaporated water into a counter flowing air stream.

It will thus be appreciated that a novel and beneficial multiple effect evaporator system has been discovered which utilizes the process liquid as a coolant in an evaporative condenser so that the condenser itself becomes an effect, or stage, which results in further removal of water from the process liquid.

The evaporative surface condenser has been illustrated in the process path between the third and second effects in terms of the flow of the process liquid. It is to be understood, however, that the evaporative surface condenser may be utilized between any two effects in the overall process path.

Moreover, while the present invention has been described in what is presently regarded as its most practical and best embodiment, changes and alterations will be readily recognized by those skilled in the art as being within the spirit and scope of the claims which follow.

What is claimed is:

1. A multiple effect evaporator system for concentrating a process liquid comprising:
   (a) a plurality of evaporator effects arranged in series, each effect including a process liquid inlet and a process liquid outlet; a heating fluid inlet and heating fluid outlet;
   (b) heat exchange means in each effect for passing said process liquid in heat exchange relationship with heating fluid for evaporating water out of said process liquid; and wherein evaporated water from one effect serves as heating fluid for an adjacent effect; and
   (c) an evaporative condenser provided with liquid inlet means for receiving process liquid from one of said evaporator effects, and liquid outlet means for transmitting said process liquid to another of said evaporator effects; and means for receiving heating fluid vapor and for passing said heating fluid vapor in heat exchange relationship with cooled process liquid in a cooling circuit, for condensing said heating fluid vapor.

2. The multiple effect evaporator system as defined in claim 1, wherein said heat exchange means in each effect has interior and exterior surfaces, and wherein process liquid is distributed evenly to fall as a thin film over the exterior surfaces of said heat exchange means while heating fluid vapor is passed in an opposite direction along said interior surfaces.

3. The multiple effect evaporator system as defined in claim 1 wherein the means for passing said cooled process liquid in heat exchange relationship with said heating fluid in said evaporative surface condenser comprises interior and exterior surfaces wherein said cooled process liquid flows as a falling film over said exterior surfaces while said heating fluid vapor is passed in an opposite direction along said interior surfaces.

4. The multiple effect evaporator system defined in claim 3 wherein said evaporative surface condenser further comprises a fan and wherein said cooled process liquid absorbs heat from said heating fluid vapor and thereafter gives up said absorbed heat as evaporated water to a counter flowing air stream generated by said fan.

5. The multiple effect evaporator system as defined in claim 1 and further including a plurality of heat exchangers arranged in series and interposed between said evaporative condenser liquid outlet means and said another of said evaporator effects.

6. The multiple effect evaporator system as defined in claim 3 and further comprising means for collecting heating fluid condensate from said evaporative surface condenser.

7. The multiple effect evaporator system as defined in claim 1 wherein said system includes at least five evaporator effects arranged in series, and wherein
   the first effect includes means for receiving fresh steam as the heating fluid therein;
   the second effect includes means for receiving as heating fluid evaporated water from the first effect;
   the third effect includes means for receiving as heating fluid evaporated water from the second effect;
   the fourth effect includes means for receiving as heating fluid evaporated water from the third effect;
   the fifth effect includes means for receiving as heating fluid evaporated water from the fourth effect; and wherein
   said means for receiving heating fluid provided in said evaporative condenser includes means for receiving evaporated water from said third and fifth effects.

8. The multiple effect evaporator system as defined in claim 7 wherein said fourth and fifth effects include means for receiving process liquid to be concentrated directly from a supply source and wherein:
   the fourth effect also includes means for receiving process liquid from the fifth effect;
   the third effect includes means for receiving process liquid from the fourth effect;
   the evaporative condenser inlet means for receiving process liquid includes means for receiving said liquid from the third effect;
   the second effect includes means for receiving process liquid from the evaporative condenser; and
   the first effect includes means for receiving process liquid from the second effect.

9. A multiple effect evaporator system as defined in claim 1 wherein the heat exchange means in each effect further comprises means to recirculate said process liquid through said heat exchange means.

10. A multiple effect evaporator system as defined in claim 5 wherein said heat exchangers include means for passing said process liquid in heat exchange relationship with heating fluid supplied from a plurality of said effects in order to heat said process liquid.

11. A multiple effect evaporator system as defined in claim 1 and further comprising means for supplying fresh steam from an external source to the system.

* * * * *